VARIABLE SCAN RATE HIGH RESOLUTION IMAGE TRANSMISSION SYSTEM

Filed Sept. 21, 1966 2 Sheets-Sheet 1

INVENTOR
Robert E. Wisnieff
BY
Shenier & O'Connor
ATTORNEYS

Jan. 20, 1970 R. E. WISNIEFF 3,491,200

VARIABLE SCAN RATE HIGH RESOLUTION IMAGE TRANSMISSION SYSTEM

Filed Sept. 21, 1966

2 Sheets-Sheet 2

INVENTOR

Robert E. Wisnieff

BY

Shenier & O'Connor

ATTORNEYS 3,491,200
Patented Jan. 20, 1970

3,491,200

VARIABLE SCAN RATE HIGH RESOLUTION IMAGE TRANSMISSION SYSTEM

Robert E. Wisnieff, Weston, Conn., assignor to United Aircraft Corporation, East Hartford, Conn., a corporation of Delaware Filed Sept. 21, 1966, Ser. No. 581,003
Int. Cl. H04n 3/16, 5/38
U.S. Cl. 178—7.5 5 Claims

ABSTRACT OF THE DISCLOSURE

My invention relates to an image transmission system and more particularly to an improved system for providing a mobile, high-resolution image region in an image transmission system having a given band width.

In general my invention contemplates the provision of an image transmission system in which I vary the scanning rate over a portion of the display to provide a region therein of increased resolution. I may restrict the region in one or in both coordinates. The region may readily be moved within the field.

Background of the invention

In any image transmission system the frame rate must be so set that the image moves less than one resolution element per frame. The band width of the channel between the sensor and the display determines the number of resolution elements which can be transmitted per unit time. Thus, for a given band width and scene dynamics, the number of resolution elements per frame is fixed. It will be apparent that the quality of the display where a dynamic image is being sensed is limited by the band width of the channel between sensor and display. Stated otherwise, with a system, such as a television system, operating at a standard rate, low band width transmission implies a poor resolution display. The problem is to provide maximum resolution for a given band width.

A number of suggestions have been advanced in the prior art for solving the problem outlined above. Where image motion is relatively slow, a high resolution image may be achieved by providing slow horizontal and vertical scanning rates, thus to increase the frame period and consequently the number of resolution elements per frame. This technique embodies the defects that it requires excellent stabilization if image smear is to be prevented and it cannot be employed in dynamic situations owing to the fact that the image motion must be limited to less than one resolution element per frame period. If shuttering is used to prevent smear, sensitivity will be reduced correspondingly.

Another arrangement which has been proposed is to store a frame, compare it with the succeeding frame and then transmit only the difference information. This technique takes advantage of the fact that much of the information in successive frames is redundant. While an arrangement such as this will result in appreciable increase in resolution for a given band width, it requires a very large storage capability and image data processing on both the transmitting end and the receiving end. Thus, it is so complex and expensive as to be impractical for use in a relatively low-cost system.

A third proposal of the prior art for increasing resolution is an optical arrangement employing a zoom lens to permit a fixed number of resolution elements to be uniformly distributed over either a wide field with low angular resolution or a smaller field with correspondingly increased angular resolution. All elements outside the zoomed field are lost. Not only is such a system optically complex but an arrangement must be provided for positioning the optical axis at the desired point in the field. Amorphic lenses have been used to provide an image wherein the outer portions of the field are compressed to give a high resolution center and a low resolution periphery. In order to move the high resolution region within the field, the optical axis of the lens arrangement must be moved as with the zoom system.

I have invented an image transmission system which overcomes the defects of arrangements of the prior art for achieving increased resolution in a system with a given band width. My system permits the high resolution region to be moved within the field with relative ease. It is compatible with maximum operator interpretation of the display. It is relatively simple and inexpensive for the result achieved thereby.

Description of the invention

One object of my invention is to provide a region of increased resolution in an image transmission system having a given band width.

Another object of my invention is to provide an image transmission system having a mobile, high-resolution region within the imaged presented.

A further object of my invention is to provide an image transmission system having a high-resolution image region, which system is simple and inexpensive for the result achieved thereby.

Yet another object of my invention is to provide an image transmission system having a high-resolution image region, which system is compatible with maximum operator interpretation of the display.

Other and further objects of my invention will appear from the following description.

In the accompanying drawings which form part of the instant specification and which are to be read in conjunction therewith and in which like reference numerals are used to indicate like parts in the various views.

Figures 1, 2, 3, 4, 5:
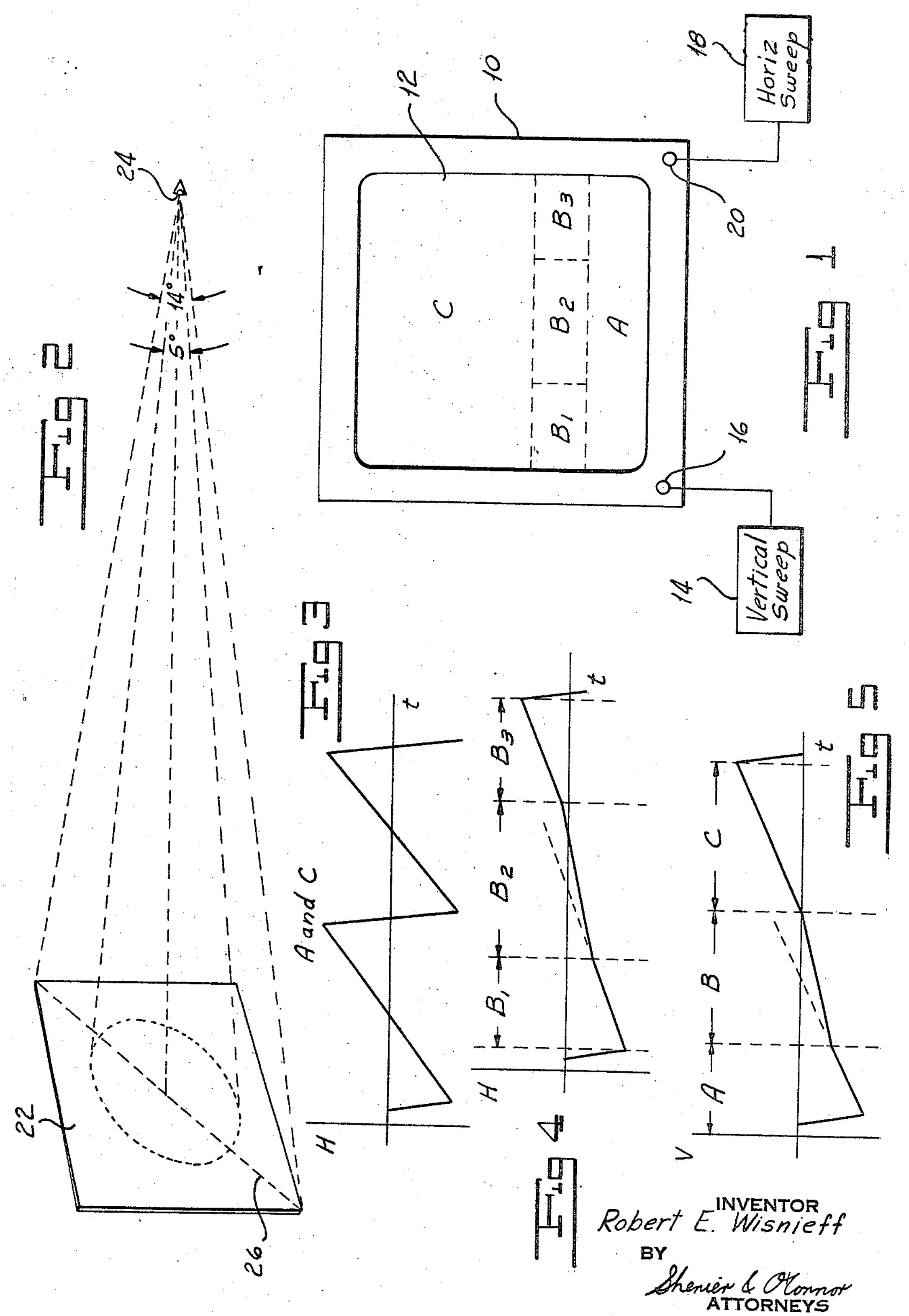
FIGURE 1 is a schematic view of the display provided by my image transmission system.
FIGURE 2 is a diagrammatic view illustrating some of the principles embodied in my image transmission system.
FIGURE 3 is a diagrammatic view of the horizontal sweep wave form employed over one region of the display of my image transmission system.
FIGURE 4 is a diagrammatic view of the horizontal sweep wave form employed in another region of the display of my image transmission system.
FIGURE 5 is a diagrammatic view of a vertical sweep wave form employed in the sweep system of my image transmission system.

Referring now to the drawings, my image transmission system includes a housing 10 provided with a display screen 12 on which an image is to be presented. The system includes a vertical sweep generator 14, the output signal of which is applied to the vertical deflection terminal 16 of the system. A horizontal sweep generator 18 applies a signal to the horizontal sweep terminal 20 of the system.

As is pointed out hereinabove, I provide a region of relatively high resolution within a frame of the display 12. I have discovered that such a system is compatible with maximum operator interpretation of the display. By way of example, referring to FIGURE 2, I have shown a display area 22. In most installations the distance from the display 22 to the observer's eye 24 is about four times a diagonal 26 of the display. Under these conditions the diagonal subtends an angle of about 14 degrees at the observer's eye 24. The normal observer cannot concentrate on the entire display since his visual acuity drops rapidly from the center of attention down to about fifty percent at the edge of a cone subtending an angle of 5 degrees. It can readily be demonstrated that the corresponding area on the display 22 is about twenty percent of the field for a square display. It will be seen that high resolution over a region in excess of twenty percent of the field cannot fully be assimilated by the observer. Thus, an arrangement which provides a window of high resolution within the field at the expense of resolution outside the window is entirely compatible with the operator's interpretation capability.

Again by way of example, if the density of resolution elements in a twenty percent window is doubled, there will result an increase in resolution by the factor $\sqrt{2}$ in each coordinate. When that is done, the density of elements in the remainder of the field is seventy-five percent of the original density which corresponds to 0.866 of the original resolution in each coordinate.

Referring now to FIGURES 1 and 3 to 5, I divide the field 12 into a plurality of areas identified, respectively, as A, B1, B2, B3 and C. Over each of the respective areas I so vary the wave forms produced by the generators 14 and 18 as to give me the desired resolution in the various areas. For example, as shown in FIGURE 3, I may provide a normal horizontal sweep wave form in each of the areas A and C. In area B, however, as shown in FIGURE 4, I change the slope of the wave form in each of the sweep areas B1, B2 and B3. It can readily be seen that I employ the period corresponding to two horizontal lines in a normal area A or C to scan a single line within the area B. In this way resolution within the area B is increased. Moreover, for a reason which will be apparent from the description hereinafter, I may further reduce the slope of the wave form in the area B2. Referring to FIGURE 5 I have shown the vertical sweep wave form, the slope of which is reduced during the high resolution region B. If the reduction is in the same ratio as the horizontal line period increase, then the vertical resolution will be unaltered. If the slope of the vertical sweep is further reduced, then the vertical resolution also will be increased.

As has been explained hereinabove, in the region B2 I may further change the horizontal slope within a line in the same manner as that of the vertical wave form is changed within the field. By so doing I provide a window restricted in both coordinates as indicated by the region B2. It will readily be appreciated that the window may be shifted within the field merely by changing the wave forms put out by generators 14 and 18. Moreover, while I have described my system as being based on a finite combination of linear sweep segments, I might also employ nonlinear wave forms to achieve optimum distribution of resolution within a field.

Figure 6:
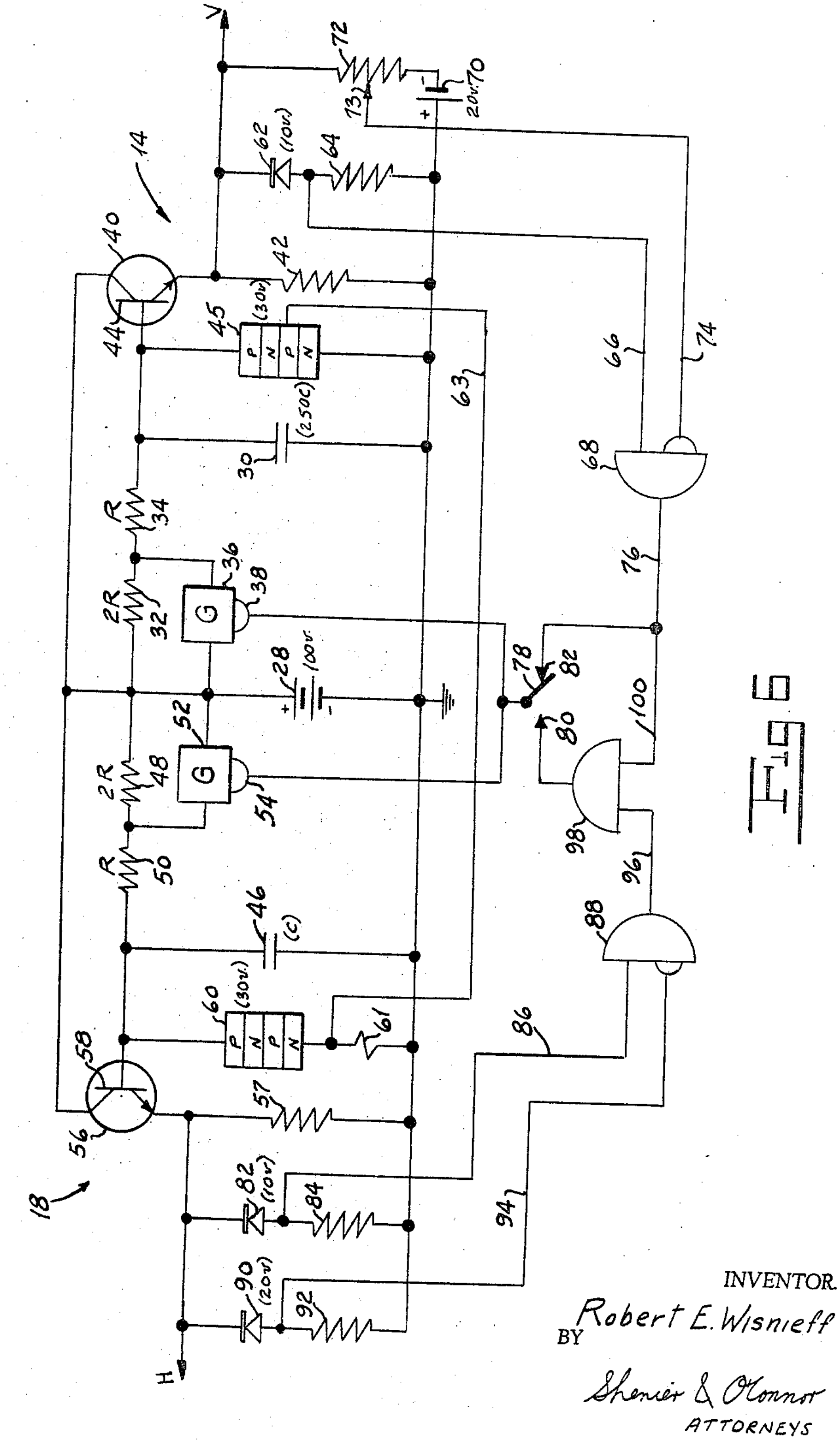
FIGURE 6 is a schematic view of one form of circuitry which I may employ to generate the wave forms required in my sweep system.

Referring now to FIGURE 6, one form of circuit which can be employed to generate the wave forms required for operation of my sweep system includes a vertical sweep portion indicated generally by the reference character 14 and a horizontal sweep wave form portion indicated generally by the reference character 18. To generate the vertical sweep signal, a battery 28 is adapted to change a capacitor 30 either through series-connected resistors 32 and 34 or through a bypass gate 36 and resistor 34. Gate 36 is of the type which normally is conductive so that in the absence of an inhibiting signal at an input terminal 38, battery 28 charges the capacitor 30 through the resistsor 34. As will be explained hereinafter, I select resistor 34 to have a resistance value R and I select resistor 32 to have a resistance value 2R. If the capacitor 30 has a capacitance value C, for example, with gate 36 conductive the charging time constant of the circuit will be RC. With gate 36 inhibited the time constant is 3RC.

I connect an npn transistor 40 in series with an output resistor 42 across the battery 28. I apply the potential on capacitor 30 to the base 44 of transistor 40. As the capacitor 30 begins to charge, transistor 40 conducts to develop an output voltage V across resistor 42. I connect a pnpn device 45 across capacitor 30 to discharge the capacitor at the end of a vertical sweep. If battery 28 has a potential of 100 v., for example, I may select device 45 to have a breakdown voltage of 30 v. to provide a relatively linear sweep voltage.

Battery 28 also is adapted to charge a capacitor 46 through series-connected resistors 48 and 50 when a normally conductive gate 52 shunting the resistor 48 is inhibited by the presence of a signal at its control terminal 54. In the absence of a signal at the terminal 54, battery 28 charges capacitor 46 through gate 52 and resistor 50. The resistors 48 and 50 may have respective resistance values of 2R and R. I select the capacitor 46 to have a capacitance value $C/250$, for example, providing a time constant of $RC/250$ with gate 52 conducting. With gate 52 inhibited, the time constant will be $3RC/250$. Owing to the fact that the value of capacitor 30 is 250 times that of capacitor 46, the latter will normally charge at 250 times the rate at which the former charges.

I connect a transistor 56 and an output resistor 57 in series across battery 28 and apply the potential on capacitor 46 to the base 58 of transistor 56. Thus, when capacitor 46 charges, transistor 56 conducts to develop a horizontal sweep voltage H across resistor 57. A pnpn device 60 connected in series with a small resistor 61 across capacitor 46 fires at the end of a horizontal sweep. The device 60 may, for example, have a breakdown voltage of 30 v. In order to synchronize the vertical and horizontal sweeps, I may apply the voltage on resistor 61 to the pnpn device 45 by means of a channel 63.

As has been explained hereinabove, in one form of my invention I may provide a high resolution region restricted in one coordinate only. This would be the B region of FIGURE 1, wherein all the sub-regions B1, B2 and B3 would be the same. A Zener diode 62 connected in series with a resistor 64 across the output resistor 42 is adapted to break down at a certain potential to initiate the sweep voltage slope change. For example, I may select the diode 62 to break down at a potention of 10 v. to provide a signal on one input channel 66 of a two-input AND circuit 68. The end of the modified slope portion of the vertical sweep voltage is determined by a bias battery 70 and a resistor 72 in series across resistor 42. Battery 70 may have a potential of, for example, 20 v. I so connect the battery that when the signal across resistor 42 reaches 20 v. a brush 73 is at ground potential. Immediately thereafter a signal is applied to inhibiting channel 74 of circuit 68. It will be appreciated that brush 73 can be positioned to determine the point at which the signal appears on channel 74. By using a similar arrangement in place of diode 62 and the Zener diode circuits to be described hereinafter, the location of the high resolution region within the field can be changed.

From the portion of the sweep voltage generator thus far described, it will be apparent that from the start of the vertical sweep until the voltage V reaches 10 v., capacitor 30 will charge at a rate determined by the time constant RC. When diode 62 breaks down to provide a signal on channel 66 with no signal on inhibiting channel 74, the output channel 76 of circuit 68 carries a signal.

I connect a switch arm 78, adapted to engage a contact 80 or a contact 82, to the inhibiting input terminals 38 and 54 of gates 36 and 52. In one form of my circuit, switch 78 engages contact 82 to apply the signal on channel 76 to the terminals 38 and 54 when the vertical sweep voltage reaches 10 v. for example. When that occurs, both gates 36 and 52 are inhibited so that capacitor 30 charges at a rate determined by the time constant 3RC and capacitor 46 charges at a rate determined by the time constant $3RC/250$. It will readily be appreciated that since both time constants are increased, the slopes of both the horizontal and vertical wave forms are reduced in the B region of the display.

When the vertical sweep voltage V reaches a potential of 20 v., a voltage appears on inhibiting channel 74 to remove the signal from channel 76 thus to remove the inhibiting signal from terminals 38 and 54 to return gates 36 and 52 to the conductive state. When that occurs, resistors 32 and 48 are removed from the respective charging circuits and the horizontal and vertical wave forms return to their original shape.

As has further been explained hereinabove, I may so arrange my system as to provide a window B2 of increased resolution restricted in both coordinates of the screen 12. A Zener diode 82 connected in series with a resistor 84 across output resistor 57 is adapted to break down at, for example, a point at which the horizontal sweep voltage H reaches 10 v. to provide a signal on one input channel 86 of a two-input AND device 88. A second Zener diode 90 adapted to break down at a point at which the voltage H reaches a value of 20 v., for example, is connected in series with a resistor 92 across output resistor 57 to provide a signal on an inhibiting input channel 94 of the device 88. With a signal present in channel 86 and with no signal on channel 94, circuit 88 supplies a signal to one input channel 96 of a two-input AND circuit 98, the other input channel 100 of which is connected to channel 76. In this second mode of operation of my system, I engage arm 78 with contact 80 which is connected to the output of the AND circuit 98.

With arm 78 in engagement with contact 80, an inhibiting signal is applied to each of the terminals 38 and 54 only during the periods of time when each of the horizontal and vertical sweep voltages is in the range of between 10 and 20 v.

In operation of my image transmission system to provide a high resolution window within the field of a system having a given band width, I so set each of the generators 14 and 18 as to produce a horizontal wave form in the region B having a slope which is less than that of the wave form in the normal regions A and C to increase resolution in the region B. Concomitantly I set generator 14 to provide a vertical deflection wave form having a reduced slope in the B region. By further reducing the slope of the horizontal wave form within a line, I may provide a window B2 which is reduced in both coordinates. This increase of resolution is achieved at the expense of resolution outside the region. As has been pointed out hereinabove, owing to the limitations of the observer's powers of interpretation, my system is consistent with the observer's capabilities.

It will be seen that I have accomplished the objects of my invention. I have provided an image transmission system for providing a region of increased resolution within the field of a system having a given band width. My system has the capability of shifting the window within the field. It is simple and inexpensive for the results achieved thereby. My arrangement is consistent with an observer's powers of interpretation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an image transmission system, a display having a certain field, means for scanning said field, first variable means providing a first coordinate sweep voltage for said scanning means, second variable means providing a second coordinate sweep voltage, means for actuating said first variable means to provide a sweep voltage waveform of a first constant slope over a first portion of said field and of a second constant slope over another portion of said field, means for actuating said second variable means to provide a second coordinate sweep voltage wave form of a first constant slope over said first portion of said field and of a second constant slope over said other portion of said field, said second coordinate wave form second slope being less than said second coordinate wave form first slope in said region.

2. In a system as in claim 1 in which the ratio of the first coordinate sweep voltage slopes is the same as the ratio of the second coordinate sweep voltage slopes.

3. In a system as in claim 1 in which said coordinates are orthogonal whereby said scanning means provides a series of lines in said field and wherein said first coordinate sweep voltage actuating means comprises means for further reducing the slope of said first coordinate sweep voltage wave form over a portion of said lines within said region.

4. In a system as in claim 1 in which said actuating means comprise means responsive to said first coordinate sweep voltage at a first magnitude thereof for concomitantly reducing the slope of said first coordinate sweep voltage wave form from said first slope to said second slope and the slope of said second coordinate sweep voltage wave form from a first constant slope to a second constant slope.

5. In a system as in claim 1 in which said actuating means comprise means concomitantly responsive to said first coordinate sweep voltage at a first magnitude thereof and to said second coordinate sweep voltage at a first magnitude thereof for concomitantly reducing the slope of said first coordinate sweep voltage wave form from said first slope to said second slope and said second coordinate sweep voltage wave form from a first constant slope to a second constant slope and means selectively responsive to said first coordinate sweep voltage at a second magnitude thereof and to said second coordinate sweep voltage at a second magitude thereof for concomitantly returning said sweep voltage wave forms from said second slopes to said first slopes.

References Cited

UNITED STATES PATENTS

| | | | |
|---|---|---|---|
| 2,849,609 | 8/1958 | Casey. | |
| 2,965,709 | 12/1960 | Cherry et al. | |
| 3,204,026 | 8/1965 | Doundoulakis. | |
| 3,210,599 | 10/1965 | Ward | 315—27 |
| 2,903,584 | 9/1959 | Jaffe et al. | 328—185 |

FOREIGN PATENTS

| | | | |
|---|---|---|---|
| 678,034 | 8/1952 | Great Britain. | |

ROBERT L. GRIFFIN, Primary Examiner

ROBERT L. RICHARDSON, Assistant Examiner

U.S. Cl. X.R.

178—6.8, 7.7; 315—19, 24; 328—185